US012803479B2

(12) United States Patent
Watanabe et al.

(10) Patent No.: US 12,803,479 B2
(45) Date of Patent: Nov. 17, 2026

(54) INDUCTION MOTOR WITH UNKNOWN ELECTRICAL CONSTANTS

(71) Applicant: Hitachi Industrial Equipment Systems Co., Ltd., Tokyo (JP)

(72) Inventors: Hiroshi Watanabe, Tokyo (JP); Yusaku Onuma, Tokyo (JP); Takuya Sugimoto, Tokyo (JP); Yoshitaka Iwaji, Mito (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 236 days.

(21) Appl. No.: 18/720,939

(22) PCT Filed: Oct. 21, 2022

(86) PCT No.: PCT/JP2022/039313

§ 371 (c)(1),
(2) Date: Jun. 17, 2024

(87) PCT Pub. No.: WO2023/132114

PCT Pub. Date: Jul. 13, 2023

(65) Prior Publication Data

US 2025/0070700 A1 Feb. 27, 2025

(30) Foreign Application Priority Data

Jan. 5, 2022 (JP) ................................ 2022-000540

(51) Int. Cl.
*H02P 21/16* (2016.01)
*H02P 21/22* (2016.01)
*H02P 27/08* (2006.01)

(52) U.S. Cl.
CPC ............. *H02P 21/22* (2016.02); *H02P 27/08* (2013.01)

(58) Field of Classification Search
CPC ...... H02P 21/22; H02P 27/08; H02P 2207/01; H02P 21/16
See application file for complete search history.

(56) References Cited

U.S. PATENT DOCUMENTS 6,066,934 A * 5/2000 Kaitani .................. H02P 21/16 318/801
2008/0018284 A1 1/2008 Kinpara et al.
(Continued)

FOREIGN PATENT DOCUMENTS

JP 62-79380 A 4/1987
JP 06-153568 A 5/1994
(Continued)

OTHER PUBLICATIONS

Extended European Search Report received in corresponding European Application No. 22918703.4 dated Nov. 19, 2025.
(Continued)

*Primary Examiner* — Muhammad S Islam
(74) *Attorney, Agent, or Firm* — MATTINGLY & MALUR, PC

(57) ABSTRACT

The objective is to accurately estimate the electrical constants required for control of a three-phase induction motor for which the electrical constants are unknown. To achieve the above-mentioned purpose, a three-phase induction motor, a fixing mechanism that can fix the rotation axis of the three-phase induction motor, an inverter that drives the three-phase induction motor, a current detection means that detects the current of the three-phase induction motor, the current detection means for detecting the current of the three-phase induction motor and control the three-phase induction motor by using the inverter, wherein the inverter controls the three-phase induction motor with the rotating shaft fixed by the fixing mechanism, energizes DC current and three-phase AC current, and measures the electrical
(Continued)

constant of the three-phase induction motor using the control voltage obtained as a result of the energization.

3 Claims, 8 Drawing Sheets

(56) References Cited

U.S. PATENT DOCUMENTS

| | | | | |
|---|---|---|---|---|
| 2008/0079378 | A1 | 4/2008 | Nakatsugawa et al. | |
| 2022/0286070 | A1* | 9/2022 | Furutani ................. | H02P 23/14 |

FOREIGN PATENT DOCUMENTS

| | | | |
|---|---|---|---|
| JP | 08-43462 | A | 2/1996 |
| JP | 2000-095453 | A | 4/2000 |
| JP | 4540674 | B2 | 9/2010 |

OTHER PUBLICATIONS

Sensorless Vector Control of AC Drive Systems, IEEJ Technical Committee for Investigation on Organizing Sensor less Vector Control (Edit), Ohm-sha, Inc. published Sep. 25, 2014, p. 153-164.
International Search Report of PCT/JP2022/039313 dated Dec. 13, 2022.

* cited by examiner

INDUCTION MOTOR WITH UNKNOWN ELECTRICAL CONSTANTS

TECHNICAL FIELD

This invention relates to variable speed drive of induction motors and a method for estimating the electrical constants required for control.

BACKGROUND ART

Induction motors are widely used in the industrial and transportation fields, etc. Induction motors are standardized as general-purpose motors, and general-purpose inverters that drive them at variable speed are also available from various companies. Control technology for general-purpose inverters is also advancing, and their applications are expanding beyond variable-speed drive of fans and pumps to include cranes, conveyors, and other applications that require high torque from low speeds.

Many products use speed sensorless vector control as the control technology for high torque induction motors. Speed sensor less vector control can realize highly accurate and responsive control of induction motors, but the electrical constants of the induction motor to be controlled must be set accurately. Therefore, it is difficult to drive an induction motor with unknown electrical constants without adjustment. To solve this problem, the general-purpose inverter with speed sensorless vector control has an automatic adjustment function for electrical constants, and this adjustment process is performed before actual operation to set the electrical constants.

Prior art documents in this technical field include Patent Document 1 and Non-Patent Document 1. Patent document 1 describes a method of AC excitation of an induction motor in a constrained state, measuring the synthetic impedance twice at two frequencies, and mathematically deriving an electrical constant from these results. Non-patent literature 1 also describes basic techniques for sensorless vector control of induction motors, and the controller is based on these techniques.

CITATION LIST

Patent Document

[Patent document 1] Japanese unexamined patent publication Tokkaihei6-153568

Non-Patent Document

[Non-patent document 1]"Sensorless Vector Control of AC Drive Systems," IEEJ Technical Committee for Investigation on Organizing Sensor less Vector Control (Edit), Ohm-sha, Inc. published Sep. 25, 2014, p. 153-164.

SUMMARY OF THE INVENTION

Problems to be Solved by the Invention

In the patent document 1, the electrical constants of induction motors are mathematically obtained by matching them to a normative model, a technique that attempts to fit the resistance and reactance to a mathematical model equation. Specifically, the four constants of primary resistance, secondary resistance, leakage inductance, and excitation inductance are considered as concentration constants, and are obtained by mathematically solving simultaneous equations. However, the actual electrical characteristics of induction motors are distributed constants, and excitation by current, or voltage, or frequency under conditions different from those of actual operation is a major error factor.

If the frequencies of the first and second excitation are not separated by a factor of 2, the impedance difference will not appear, and the accuracy of the simultaneous equations will deteriorate.

However, increasing the frequency under the constraint condition means that the induction motor is excited under the condition of "over-slip" in the induction motor drive, which is also a condition that is not possible in actual operation. Therefore, it is difficult in principle to obtain highly accurate electrical constants with these concentration constant model measurement methods.

Non-patent document 1 describes only basic techniques for sensorless vector control of induction motors and, it does not describe highly accurate estimation of the electrical constants required for control for an induction motor whose electrical constants are unknown.

In view of the above background art and problems, the purpose of the present invention is to estimate with high accuracy the electrical constants required for control for induction motors whose electrical constants are unknown.

Means to Solve the Problem

The invention comprises, to give an example, a three-phase induction motor, a fixing mechanism that can fix the rotation axis of the three-phase induction motor, an inverter that drives the three-phase induction motor, a current detection means that detects the current of the three-phase induction motor, the current detection means for detecting the current of the three-phase induction motor and control the three-phase induction motor by using the inverter, wherein the inverter controls the three-phase induction motor with the rotating shaft fixed by the fixing mechanism, energizes DC current and three-phase AC current, and measures the electrical constant of the three-phase induction motor using the control voltage obtained as a result of the energization.

Effects of the Invention

According to this invention, it is possible to measure the constants of induction motors with unknown constants under the same conditions as actual operation without rotating and driving the induction motor, thus realizing highly accurate measurement of electrical constants. This enables to secure the starting torque and realize a stable drive system for induction motors.

MODE FOR CARRYING OUT THE INVENTION

The following is an example of the invention, illustrated with drawings.

Example 1

Figure 1:
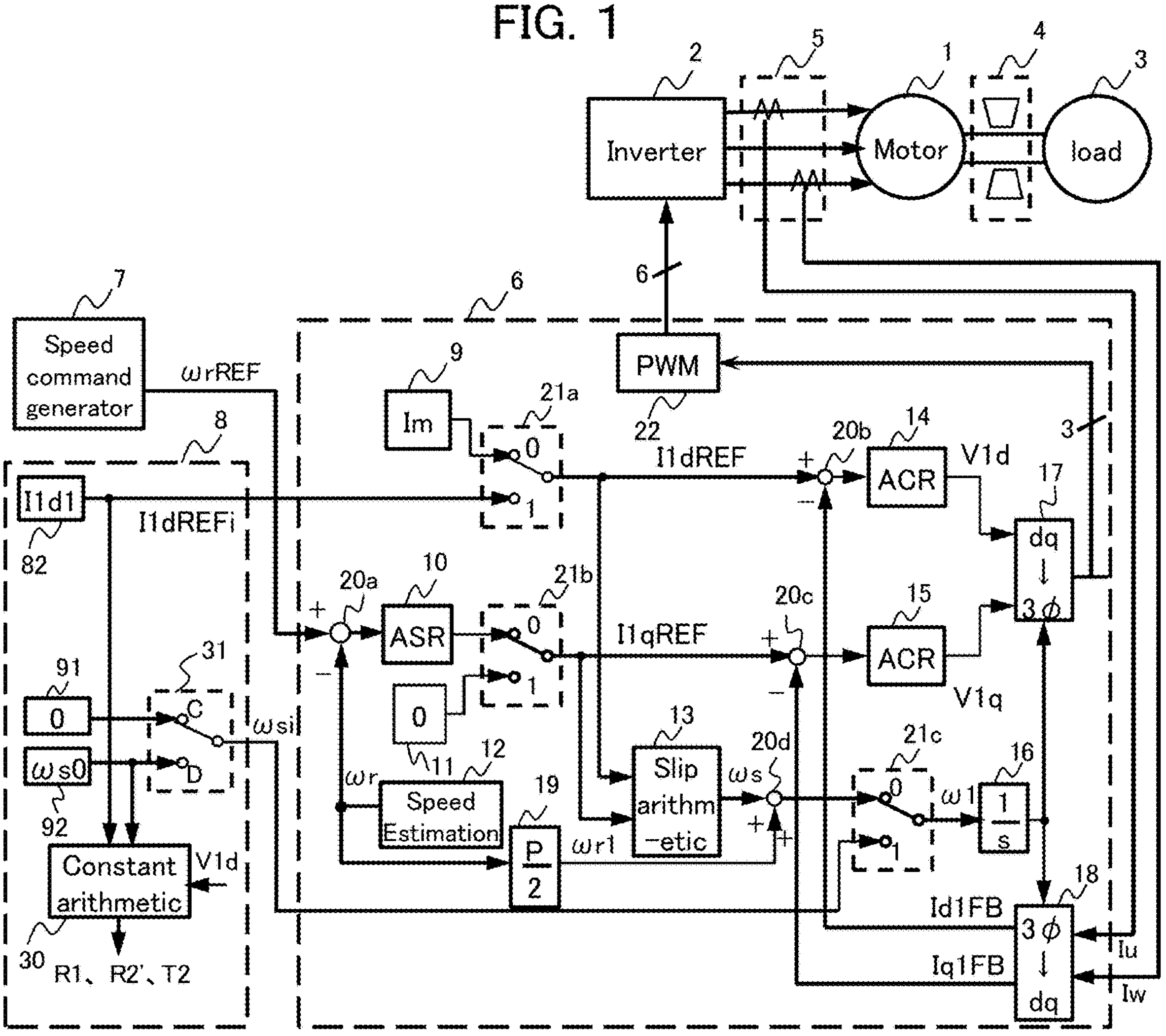
FIG. 1 Configuration diagram of the drive unit for induction motor in Example 1.

FIG. 1 shows the configuration of the drive unit for induction motor in this example.

In FIG. 1, the drive unit for induction motor is intended to drive the three-phase induction motor1 (hereinafter referred to as induction machine1), and it is roughly comprising inverter2, mechanical load3, brake4, current detector5, controller6, speed command generator7 and constant estimator8. In FIG. 1, the names of the components are abbreviated in some parts, and the names of the components with the corresponding symbols described below are the official names.

In FIG. 1, inverter2 performs switching based on the PWM (pulse width modulation) signal output from controller6 and applies a pulse voltage to the induction machine1.

The mechanical load 3 is a load device driven by the Induction machine 1 and it is assumed here to a device that requires high torque from the time of starting, such as a crane or a conveyor.

Brake4 is a device attached to mechanical load3, and by operating brake4, the rotation axis of Induction machine1 is fixed, and rotational operation is impossible at a rated torque.

The current detector5 is a current sensor that detects the phase current flowing in the induction machine1.

Controller 6 is a controller that controls the induction machine1 in a speed sensorless vector control mode and it is equipped with both a “real operation mode” that realizes normal speed sensorless vector control and a “measurement mode” for measuring electrical constants before real operation. Switching between these functions is performed by the switcher in the configuration diagram described below.

Controller 6 is comprising an Im setting device9 that provides the excitation current command Im to the induction machine 1, a speed controller (ASR: Auto Speed Regulator) 10 that tracks the rotation speed of the induction machine 1 to the speed command ωrREF, a zero setter11 that sets the torque current command to zero in the measurement mode, a speed estimator12 that estimates the rotation speed of the induction machine 1 without using a speed sensor, and a slip arithmetic unit13 that sets the sliding frequency of the induction machine 1, the slip arithmetic unit13 sets the slip frequency of the induction machine1, the d-axis current controller (ACR: Auto Current Regulator) 14 controls the current of the d-axis, the q-axis current controller15 controls the current of the q-axis, and the drive frequency of the induction machine1 is integrated and set to zero. coordinate axis calculator16 that calculates the coordinate conversion phase θ*d* by integrating the drive frequency of the machine1, dq inverse coordinate converter17 that converts voltage commands on the dq axis into three-phase AC voltage commands, and dq coordinate converter18 that converts the current value detected by the current detector 5 into the current value on the dq-axis pole logarithmic gain19 converts the rotation speed of the induction machine1 into the electric angular frequency, and additive and subtract20*a*, 20*b*, 20*c*, 20*d*, switchers21*a*, 21*b*, 21*c* that switch signals between actual operation mode and measurement mode, and PWM generator22 that generates PWM signals to drive inverter2 based on three-phase AC voltage directive.

Constant estimator8 is comprising a constant arithmetic instruments30 estimates electric constant from the current energizing induction machine1 and applied voltage at that time,

- a slip frequency switcher31 switches the slip frequency directive ωsi output by the inverter in the measurement mode, a measuring excitation current setting device82 sets the current command in the measurement mode, a zero setter91 sets the slip frequency to zero in the measurement mode, and an ωs0 setting instrument92 that sets the slip frequency ωs0 in the measurement mode.

Next, the basic operation of the actual operation mode and the measurement mode in FIG. 1 is described.

First, in the actual operation mode, switchers 21*a* to *c* in controller 6 are switched to the “0” side and normal speed sensorless vector control is executed.

Speed command ωrREF is input to controller 6 from speed command generator 7, the speed controller10 operates to output the torque current command I1qREF so that the error signal becomes zero. Although various methods have been proposed for speed estimation by speed estimator12, it is assumed that a general method of estimating speed from the speed electromotive voltage is used.

In additive and subtract20*c*, the error signal between the torque current command I1qREF and the detected value of q-axis current I1qFB is calculated, and the q-axis voltage command V1q is calculated in q-axis current controller15 so that the value becomes zero.

Similarly, in additive and subtract20*b*, the error signal between the excitation current command I1dREF (Im is selected in the actual operation mode) and the detected value of d-axis current I1dFB is calculated and voltage command V1d is calculated in the d-axis current controller14 so that the error signal becomes zero.

The voltage commands V1d and V1q are converted into three-phase voltage commands at the dq inverse coordinate converter17 and then converted into PWM signals that drive inverter2 at the PWM generator22.

In addition, the dq coordinate converter18 converts the phase currents (here, Iu and Iw) detected by the current detector5 into I1dFB and I1qFB, which are values on the rotation coordinate axes (dq axis).

The slip arithmetic unit 13 calculates the slip frequency ωs given to the induction machine 1 using the excitation current command I1dREF and torque current command I1qREF according to the following Formula (1).

[Number 1]

$$\omega_s = \frac{1}{T_2}\frac{I_{1qREF}}{I_{1dREF}} = \frac{R_2}{L_2}\frac{I_{1qREF}}{I_{1dREF}} \quad (1)$$

where T2 is the second-order time constant (L2/R2) of Induction machine 1.

The speed estimate ωr obtained by speed estimator12 is converted to the electric angular frequency ωr1 by pole logarithmic gain19 and the slip frequency ωs obtained by Formula (1) is added to this value (additive and subtract20*d*), The driving frequency ω1 of the induction machine1 is obtained. This ω1 is integrated by coordinate axis calculator16 to obtain the coordinate transformation phase θd.

The above is the basic operation of the "actual operation mode". The "slip" shown in Formula (1) is set using the electrical constant T2, which is an extremely important constant in realizing vector control.

Next, the operation of the "measurement mode," which is a feature of this example, is described. In the measurement mode, switchers 21*a* through *c* are all switched to the "1" side. By setting switcher 21*a* to "1", the excitation current command is switched to I1dREFi output from constant estimator 8. Also, by switcher21*b*, the torque current command I1qREF is set to zero. Furthermore, by switcher 21*c*, the drive frequency of Induction machine 1 is changed to ωsi, which is output by constant estimator 8.

The constant estimator8 outputs the excitation current command I1d1 for constant estimation, and simultaneously outputs two slip frequencies for constant estimation, "zero" and the preset value "ωs0", in time-division order. The switching is performed by slip frequency switcher 31, which switches the slip frequency by switching ωsi between the "C" and "D" sides.

Figure 2:
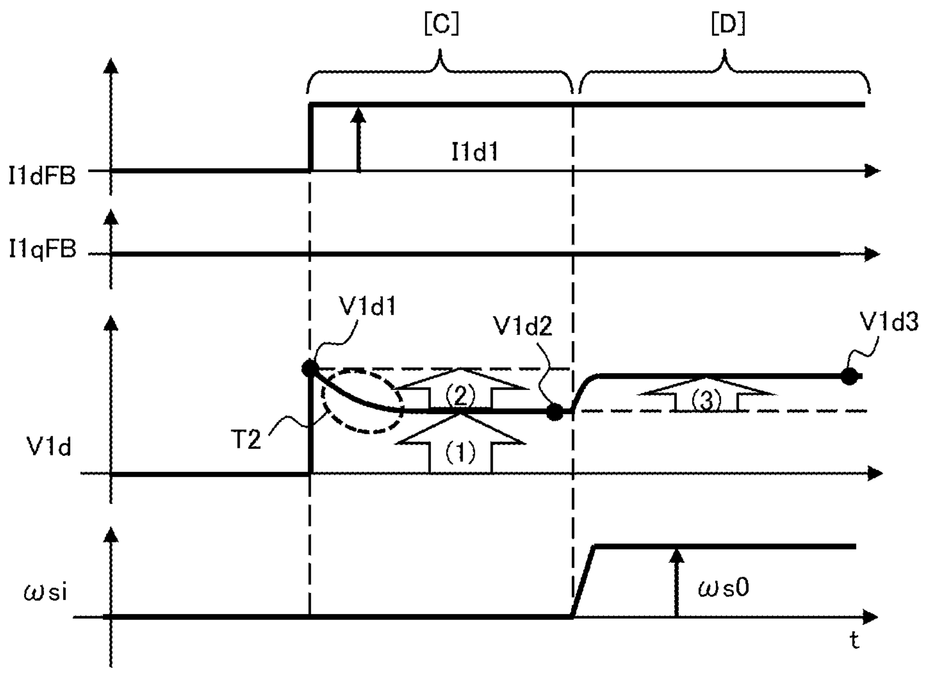
FIG. 2 The figure shows the waveforms of current, voltage, and frequency during constant estimation in Example 1.

FIG. 2 shows the operating waveforms in the measurement mode in this example. During the measurement mode, the rotation axis of the induction machine 1 is assumed to be fixed by brake4. In this state, the estimation calculation of the constants is performed during the periods [C] and [D] in FIG. 2. During this period, the excitation current command I1d1 is given and two slip frequencies ωsi are also given. Since the slip frequency ωsi is zero in the period [C], DC excitation is performed by DC current, and in the period [D], ωs0 is given and three-phase AC excitation is performed by three-phase AC current.

After the start of DC excitation, the d-axis current is controlled by the d-axis current controller14 to instantly become the excitation current command I1d1. The response frequency of the current controller is set sufficiently short relative to the electrical time constant of the induction machine1. As a result, the d-axis voltage command V1d jumps up significantly and gradually decays as shown in FIG. 2. The decay time constant is T2, which is the quadratic time constant of the induction machine1 and will be explained later. The value of this initial jump is "V1d1" and the value at which the decay converges is "V1d2. Furthermore, after the transition to the period of [D], when the slip frequency is switched to ωs0, the d-axis voltage command V1d converges to the value of "V1d3".

In this measurement mode, the coordinate transformation phase θd is calculated by integrating ωs0 directly by switcher21*c*. Since the torque current command I1qREF is zero, the coordinate transformation phase θd is given by the current phase with respect to the excitation current command I1dREF. In other words, the dq coordinate axis in the measurement mode is not based on the secondary magnetic flux as in the actual operation mode, but current control is performed on the coordinate axis based on the current phase.

In addition, since ωs0 is given with the rotor fixed, a torque will be generated with ωs0 as the slip frequency. According to the principle of vector control, a part of the energized current becomes torque current, but with the electrical constants unknown, the torque current cannot be isolated. In this example, the current is energized with this torque current component unknown, current control is performed on the coordinates according to the current phase, and the resulting voltage command is used to calculate the electrical constants. The torque current command I1qREF is controlled to zero, which makes it possible to estimate the electrical constants using only the value of the d-axis voltage command, as described below.

In other words, the current to be energized is controlled on the Cartesian coordinate axes of the axes according to the current phase output by the inverter, and control is performed so that the current becomes a predetermined current on one axis and zero current on the other axis, and the electrical constant the resulting voltage values on the Cartesian coordinate axes are used to measure the electrical constants.

Using the values of "V1d1", "V1d2", and "V1d3" obtained in the measurement mode, R1, R2', and T2 are derived in constant arithmetic instruments30.

The derivation method is described below using the model equation for induction motor (see Non-Patent Document 1, Chapter 3, p. 153-164).

The three-phase induction motor can be expressed in terms of the voltage equation on the dq axis by the following formula.

[Number of 2]

$$si_{1d} = \frac{1}{L_\sigma}\left(-R_\sigma i_{1d} + \omega_1 L_\sigma i_{1q} + \frac{M}{L_2 T_2}\phi_{2d} + \omega_r\frac{M}{L_2}\phi_{2q} + v_{1d}\right) \quad (2)$$

[Number of 3]

$$si_{1q} = \frac{1}{L_\sigma}\left(-\omega_1 L_\sigma i_{1d} - R_\sigma i_{1q} - \omega_r\frac{M}{L_2}\phi_{2d} + \frac{M}{L_2 T_2}\phi_{2q} + v_{1q}\right) \quad (3)$$

[Number 4]

$$s\phi_{2d} = \frac{1}{T_2}(Mi_{1d} - \phi_{2d} + \omega_s T_2\phi_{2q}) \quad (4)$$

[Number 5]

$$s\phi_{2q} = \frac{1}{T_2}(Mi_{1q} - \phi_{2q} - \omega_s T_2\phi_{2d}) \quad (5)$$

where s: Laplace operator, i1d: primary-side excitation current (d-axis current), i1q: primary-side torque current (q-axis current), φ2d: d-axis secondary chain flux number, φ2q: q-axis secondary chain flux number, R1: primary-side winding resistance, R2: secondary-side winding resistance, M: excitation inductance, L1: primary-side inductance, L 2: secondary side inductance, and moreover,

[Number of 6]

$$T_2 = \frac{L_2}{R_2} \quad (6)$$

[Number of 7]

-continued $$L_\sigma = L_1 - \frac{M^2}{L_2} \tag{7}$$

[Number 8]

$$R_\sigma = R_1 + R_2' \tag{8}$$

[Number 9]

$$R_2' = \frac{M^2}{L_2^2} R_2 \tag{9}$$

There are relationships above.

In the DC excitation period in FIG. 2 (the period in [C]), the d-axis current i1d=I1d1 (constant value) is controlled to be i1q=0 and ω1=ωs=ωr=0. Furthermore, given i1q=0 and ω1=ωs=ωr=0, Formula (2) and Formula (4) are the following.

[Number 10]

$$0 = -R_\sigma I_{1d1} + \frac{M}{L_2 T_2}\phi_{2d} + v_{1d} \tag{10}$$

[Number 11]

$$\phi_{2d} = \frac{M}{1 + sT_2} I_{1d1} \tag{11}$$

Substituting Formula (11) into Formula (10), and further from Formula (6) and Formula (9), we obtain

[Number of 12]

$$v_{1d} = R_1 I_{1d1} - R_2' \frac{1}{1 + sT_2} I_{1d1} \tag{12}$$

Further, from Formula (8),

[Number 13]

$$v_{1d} = R_1 I_{1d1} + R_2' I_{1d1}\left(1 - \frac{1}{1 + sT_2}\right) \tag{13}$$

Since the second term on the right side of Formula (13) converges to zero as time passes, V1d2 in FIG. 2 is equal to the first term on the right side (white arrow (1) in FIG. 2) In other words, R1 can be obtained from the following using V1d2.

[Number 14]

$$R_1 = \frac{V_{1d2}}{I_{1d1}} \tag{14}$$

The right-hand side of Formula (13) is at its maximum immediately after I1d1 is started to energize, and V1d1 at that time is,

[Number 15]

$$V_{1d1} = I_{1d1}(R_1 + R_2') \tag{15}$$

Therefore, R2' can be obtained from

[Number 16]

$$R_2' = \frac{V_{1d1} - V_{1d2}}{I_{1d1}} \tag{16}$$

Formula (16) means that R2' is obtained from the voltage in the white arrow (2) in FIG. 2.

As described above, the values of R1 and R2' can be obtained by DC energization.

Next, the d-axis current continues to flow as it is, and the slip frequency is added at a value within the operating range of Induction machine 1 as ωs0. If the rated slip value of induction machine 1 is unknown, a value of 5% or preferably 1% or less of the rated drive frequency is given to avoid excessive slippage. to avoid over-slip.

At this time, since brake4 remains in the operating state for induction machine1, i1d=I1d1 (constant), i1q=0, ω1=ωs0, and ωr=0 in Formulas (2) through (5). Substituting these to obtain the steady state, the following relationship is obtained.

[Number of 17]

$$v_{1d} = R_\sigma I_{1d1} - \frac{M}{L_2 T_2}\phi_{2d} \tag{17}$$

[Number of 18]

$$v_{1q} = \omega_{s0} L_\sigma I_{1d1} - \frac{M}{L_2 T_2}\phi_{2q} \tag{18}$$

[Number of 19]

$$\phi_{2d} = \frac{1}{1 + (\omega_{s0} T_2)^2} M I_{1d1} \tag{19}$$

[Number of 20]

$$\phi_{2q} = -\frac{\omega_{s0} T_2}{1 + (\omega_{s0} T_2)^2} M I_{1d1} \tag{20}$$

Here, the d-axis secondary chain crossing flux φ2$d$ in Formula (19), compared to Formula (11), shows a decrease in value due to the given slip frequency ωs0. This also affects v1d in Formula (17), with v1d increasing with ωs0. In other words, it is clear from Formula (19) that v1d changes due to slip and that T2 is included in this factor.

Therefore, Formula (19) is substituted into Formula (17) to obtain the following relationship.

[Number of 21]

$$V_{1d3} = R_\sigma I_{1d1} - R_2' \frac{1}{1 + (\omega_{s0} T_2)^2} I_{1d1} \tag{21}$$

In the above formula, V1d3 is the convergence value during AC excitation drive in FIG. 2.

Also, substituting Formula (8), Formula (21) becomes Formula (22).

[Number of 22]

$$V_{1d3} = R_\sigma I_{1d1} + R_2' I_{1d1} - R_2' \frac{1}{1 + (\omega_{s0} T_2)^2} I_{1d1} \tag{22}$$

Here, since the first term on the right-hand side of Formula (22) is consistent with V1d2 from the relationship in Formula (14),

[Number of 23]

$$V_{1d3} = V_{1d2} + R_2'\left(\frac{(\omega_{s0}T_2)^2}{1+(\omega_{s0}T_2)^2}\right)I_{1d1} \tag{23}$$

Deriving the formula for T2 from Formula (23), we obtain

[Number of 24]

$$T_2 = \frac{1}{\omega_{s0}}\sqrt{\frac{\Delta V_{1d32}}{R_2' I_{1d1} - \Delta V_{1d32}}} \tag{24}$$

[Number of 25]

$$\Delta V_{1d32} = V_{1d3} - V_{1d2} \tag{25}$$

According to Formula (24), the secondary time constant T2 can be obtained arithmetically if there is a change between the converged d-axis voltage V1d2 during DC energization and the voltage V1d3 when ωs0 is given (the white arrow (3) in FIG. 2) and the value of R2' obtained during DC energization. In other words, the excitation current I1d1 for constant estimation is applied to the induction machine1, ωsi is switched in two steps, V1d1, V1d2, and V1d3 shown in FIG. 2 are obtained, and the operations of Formula (14), Formula (16), and Formula (24) are performed with constant arithmetic instruments30 and constant the values of R1, R2', and T2 can be obtained. In particular, the secondary time constant T2, which is necessary for vector control, can be obtained under drive conditions within the operating range of the induction machine1 without performing rotational operations.

The three-phase induction motor for which the electrical constants are to be determined is energizing desired current value, energizing direct current, energizing three-phase alternating current and sliding conditions equivalent to actual operating conditions are given by the inverter with the rotating shaft fixed. The electrical constants of the induction motor are measured from the applied voltage. This makes it possible to measure the constants of induction motors with unknown constants under the same conditions as actual operation without rotating and driving the induction motor, thus realizing highly accurate measurement of electrical constants in a short time. As a result, starting torque can be secured and a stable induction motor drive system can be realized.

Example 2

Figure 3:
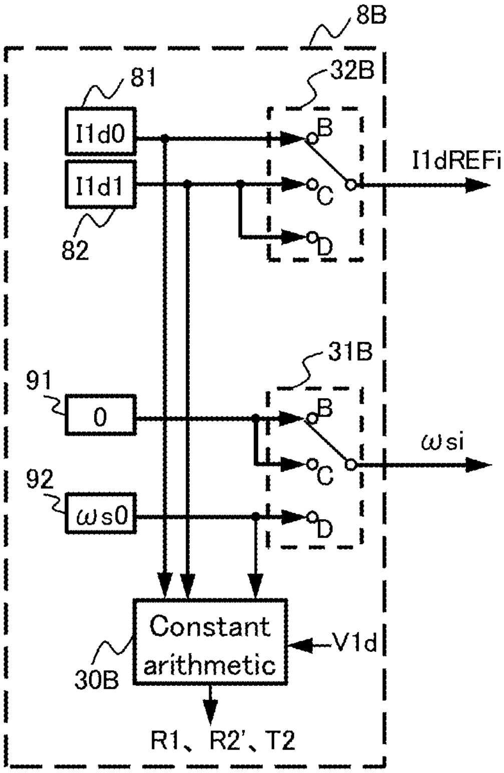
FIG. 3 The figure shows the constant estimator of the drive unit for induction motor in Example 2.
Figure 4:
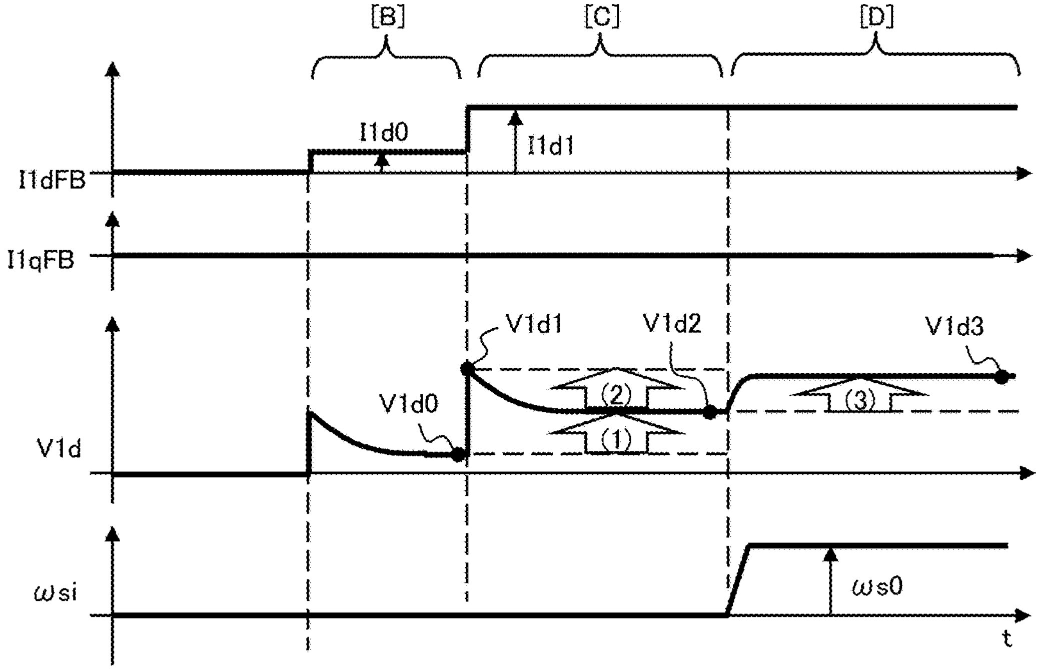
FIG. 4 The figure shows the waveforms of current, voltage, and frequency during constant estimation in Example 2.

FIG. 3 and FIG. 4 illustrate the drive unit for induction motors in this example.

FIG. 3 shows the constant estimator 8B in this example, which is an improvement of the constant estimator 8 in Example 1.

The drive unit for induction motor in this example can be realized by replacing the constant estimator 8 in FIG. 1 with the constant estimator 8B in FIG. 3.

In Example 1, the electrical constants of induction machine 1 were obtained by performing DC excitation and three-phase AC excitation once each. Since the voltage applied to the Induction machine 1 is given via the inverter 2, the voltage accuracy of the inverter 2 is important. Since inverter2 applies a voltage by the switching operation of the power semiconductor, it is susceptible to dead time (arm short-circuit prevention period), device on-voltage drop, on-resistance, etc., and voltage accuracy cannot be expected much. However, since the values of the resistance constants R1 and R2', which are the resistance components of the electrical constants, are assumed to be accurate, the voltage accuracy is important.

In this example, to eliminate the effect of this inverter2 voltage error, DC excitation is performed in two stages. Specifically, as shown in FIG. 4, a new period of DC energization [B] under reduced d-axis current is added, and the convergence value V1d0 is obtained at that time. Then, as in Example 1, a DC energization period and a three-phase AC energization period are established, and the constants are estimated and calculated.

FIG. 3 shows a block diagram of the operation of FIG. 4. In FIG. 3, the excitation current is set to two values I1d0 and I1d1 in the measuring excitation current setting devices 81 and 82, which are switched by the switcher32B. In period [B], the current I1d0 is set to a value smaller than I1d1, and in periods [C] and [D], a constant current value I1d1 is set, as in Example 1. The slip frequency switching is also responding to the periods [B], [C], and [D] using the slip frequency switcher 31B. The slip frequency is set to zero in periods [B] and [C], and ωs0 is given in period [D].

In constant arithmetic instruments30B, the following operations are used to obtain the values of R1 and R2'.

[Number of 26]

$$R_1 = \frac{V_{1d2} - V_{1d0}}{I_{1d1} - I_{1d0}} \tag{26}$$

In period [B], a current of I1d0, less than half of I1d1, is energized, and the d-axis voltage converges to V1d0 as a voltage that includes the effects of dead time and device on-resistance. This voltage includes many error factors other than the voltage drop due to R1. This error factor is also included in V1d2 obtained in period [C], but as shown in Formula (26), it is possible to eliminate the influence of both error factors by taking the difference between them. The same is true when determining R2'.

Therefore, the estimation accuracy can be greatly improved by obtaining the resistance constants R1 and R2' using the constant estimator 8B shown in FIG. 3.

With respect to T2, Formula (24) in Example 1 is used as it is, but since R2' is obtained by Formula (16), the accuracy of R2' is improved, and as a result the accuracy of T2 can be greatly improved.

Thus, according to this example, a more accurate measurement of electrical constants can be achieved.

Example 3

Figure 5:
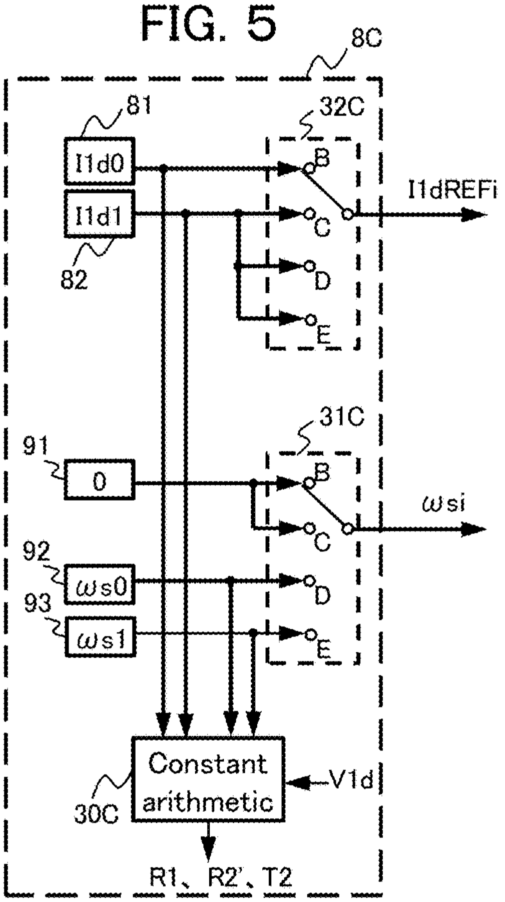
FIG. 5 The figure shows the constant estimator of the drive unit for induction motor in Example 3.
Figure 6:
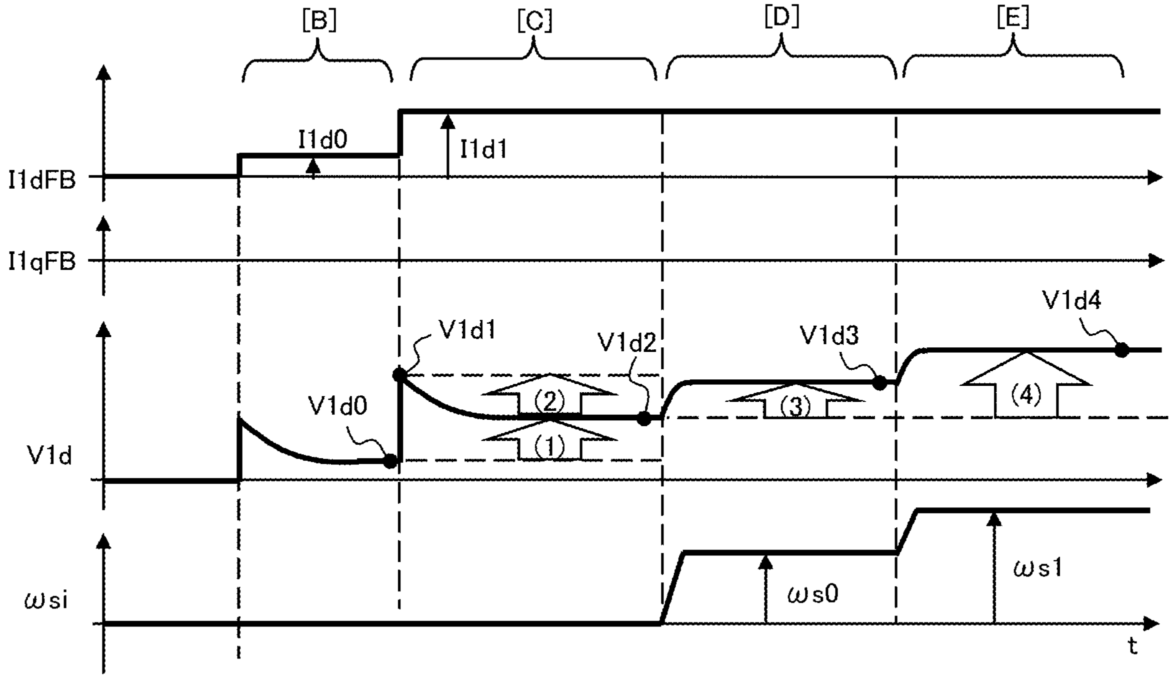
FIG. 6 The figure shows the waveforms of current, voltage, and frequency during constant estimation in Example 3.

FIG. 5 and FIG. 6 illustrate the drive unit for induction motors in this example.

FIG. 5 shows the constant estimator 8C in this example, which is an improvement of the constant estimator 8 in Example 1.

The drive unit for induction motor in this example can be realized by replacing the constant estimator 8 in FIG. 1 with the constant estimator 8C in FIG. 5.

In Examples 1 and 2, the DC excitation was performed at least once to obtain R2', and the secondary time constant T2 was obtained from the value of R2' and the d-axis voltage obtained by AC excitation using Formula (24).

If the value of R2' is not accurate, the accuracy of T2 estimation also deteriorates.

The secondary time constant T2 is the most important value to ensure the torque accuracy of the induction motor, and it is a constant that should be set with high accuracy.

In Examples 1 and 2, it is necessary to accurately obtain the voltage V1d1 (FIG. 2 and FIG. 4) at the point of the d-axis voltage jump. However, the d-axis voltage is the output of the d-axis current controller 14, and the maximum value of the jump changes with the set response frequency of the current control system and the primary time constant of the Induction machine 1. In other words, the value of R2' may change at any point after the current command I1d1 is given, depending on at what point V1d1 is obtained, and consequently the value of T2 may also change. Of course, if the current control responds with a sufficiently short time constant relative to the secondary time constant T2, no large error will occur, but if the two are close, especially if the secondary time constant is short, the error may increase, which is a problem.

To solve this problem, in this example, the secondary time constant T2 is derived without using the value of V1d1.

In this example, the sliding frequency applied to Induction machine 1 as AC excitation is applied in two stages.

Specifically, as shown in FIG. 6, a period of [E] is added as the AC excitation period. In this case, the excitation current I1d1 is kept under constant control, and only ωsi is changed from ωs0 to ωs1. For example, ωs0 is set to 1 [%] slip and ωs1 is set to 2 [%] slip to obtain a new convergence value for the d-axis voltage. The d-axis voltage obtained as a result of adding this ωs1 to Induction machine 1 is V1d4. From the d-axis voltages V1d3 and V1d4 obtained for AC excitation with two different slip frequencies, T2 is calculated.

In constant estimator 8C in FIG. 5, slip frequency switcher 31C and switcher 32C have been changed to those with four contacts, and terminal numbers B, C, D, and E in each switcher correspond to the energized periods [B] to [E] shown in FIG. 6 shown in FIG. 6. The operation from period [B] to [D] is exactly the same as in Example 2, but in period [E], a new slip frequency ωs1 is set by the ωs1 setter 93.

In constant arithmetic instruments 30C, R1 and R2' are calculated in exactly the same way as in Example 2, but T2 is derived by the following operations.

As shown in Formula (24), T2 can be calculated by ωs0, V1d3, V1d2, I1d1 and R2'.

Assuming that the slip frequency ωs1 and the excitation current I1d2 are given as conditions different from Formula (24), and the voltage V1d4 is obtained,

[Number of 27]

$$T_2 = \frac{1}{\omega_{s1}}\sqrt{\frac{\Delta V_{1d42}}{R_2' I_{1d2} - \Delta V_{1d42}}} \tag{27}$$

[Number of 28]

$$\Delta V_{1d42} = V_{1d4} - V_{1d2} \tag{28}$$

The relationship above is established. Here, from Formula (24) and Formula (27), R2' is eliminated and transformed into the formula for T2 to obtain the following formula.

[Number of 29]

-continued $$T_2 = \sqrt{\frac{\dfrac{I_{1d1}\Delta v_{1d42}}{\omega_{s1}^2} - \dfrac{I_{1d2}\Delta v_{1d32}}{\omega_{s0}^2}}{(I_{1d2}\Delta v_{1d32} - I_{1d1}\Delta v_{1d42})}} \tag{29}$$

From the above equation, T2 can be calculated without using the value of R2' by using the d-axis voltages V1d3 and V1d4 which obtained by as AC excitation, the slip frequency is changed in two stages and applied, and the convergence value V1d1 in DC excitation.

Since these voltages are all convergent values, there is no need to obtain peak values such as V1d1, and calculation errors are less likely to occur.

In Formula (28), the excitation current is set to I1d2 at the second slip frequency for generalization. However, changing the excitation current will change the main flux, which requires waiting for a response time equivalent to the secondary time constant, which is time consuming. It is advisable to leave the excitation current at I1d1 and change the slip frequency. If we organize Formula (29) as that I1d2=I1d1,

[Number of 30]

$$T_2 = \sqrt{\frac{\dfrac{\Delta v_{1d42}}{\omega_{s1}^2} - \dfrac{\Delta v_{1d32}}{\omega_{s0}^2}}{(\Delta v_{1d32} - \Delta v_{1d42})}} \tag{30}$$

and it becomes possible to obtain T2 more simply and directly.

According to the above example, the secondary time constant T2 can be obtained directly from the d-axis voltage obtained by two AC excitations, enabling more accurate constant setting.

Example 4

Figure 7:
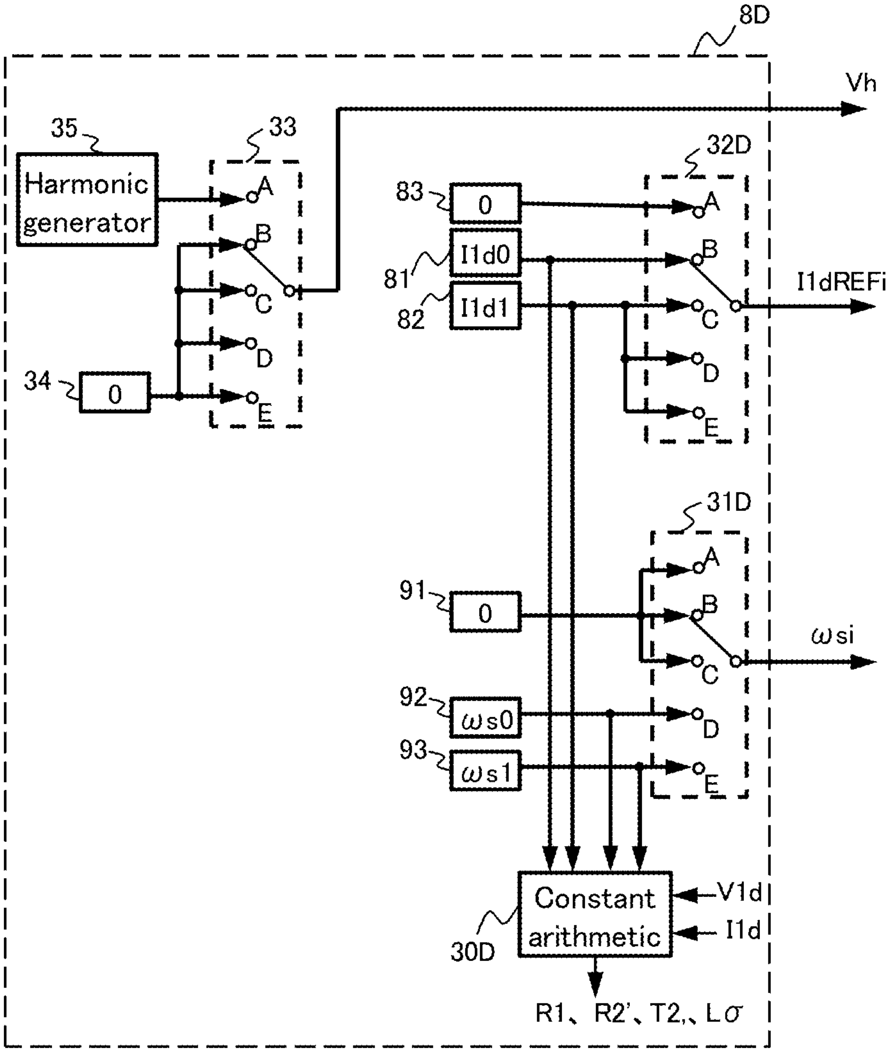
FIG. 7 The figure shows the constant estimator of the drive unit for induction motor in Example 4.
Figure 8:
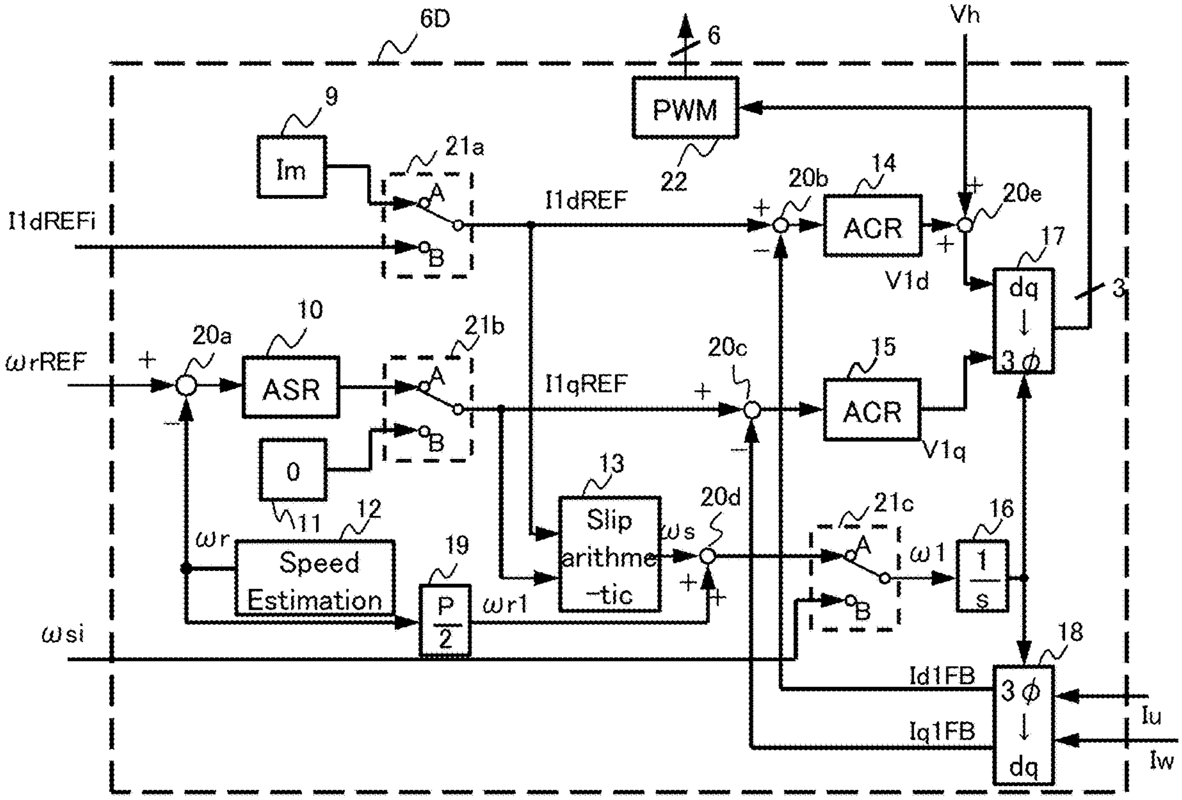
FIG. 8 The figure shows the controller of the Drive unit for induction motor in Example 4.
Figure 9:
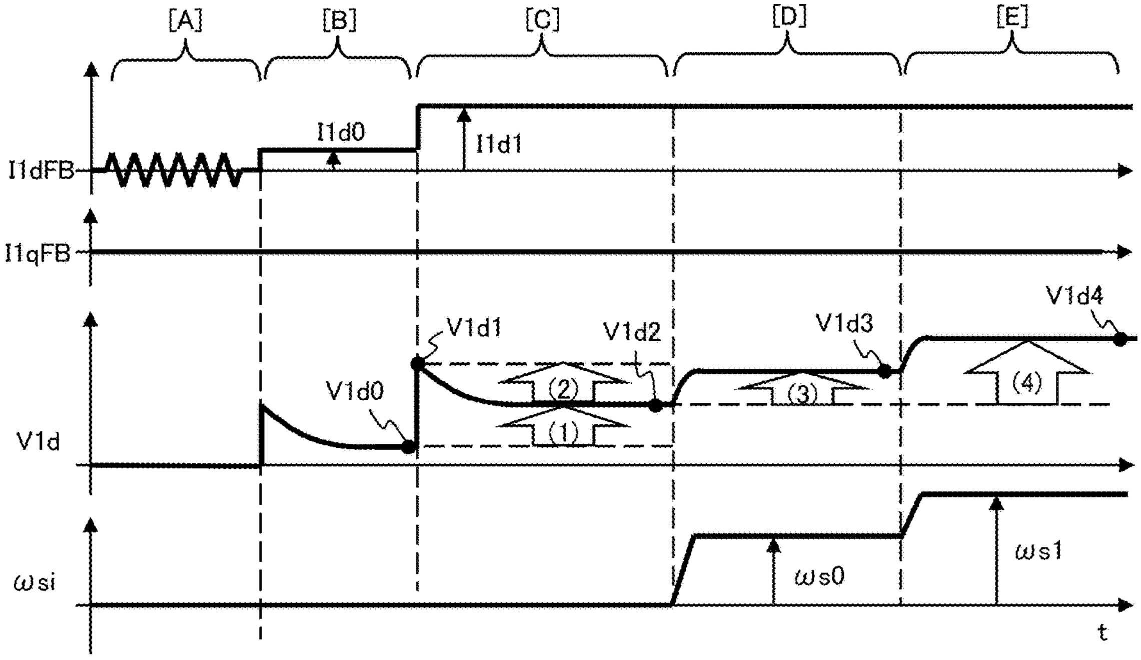
FIG. 9 The figure shows the waveforms of current, voltage, and frequency during constant estimation in Example 4.

FIG. 7 to FIG. 9 are used to explain the Drive unit for induction motor in this example.

FIG. 7 shows the constant estimator8D in this example, which is an improvement of the constant estimator8 in Example 1. Also, controller6D shown in FIG. 8 is an improvement of controller6 in FIG. 1. The drive unit for induction motor in this example can be realized by replacing the constant estimator 8 and controller 6 in FIG. 1 with the constant estimator 8D and controller 6D in FIG. 7 and FIG. 8.

In Examples 1 through 3, the derivation of electrical constants was described assuming that the d-axis and q-axis current controllers (14 and 15) are functioning. The gain setting in the current control of the induction motor can generally be set from the leakage inductance L σ and the value of the primary resistance R 1. Here, a PI controller (proportional-integral controller) is used, and the proportional gain Kp and integral gain Ki are given by the following formulars.

[Number of 31]

$$K_p = \omega_c \cdot L_\sigma \tag{31}$$

[Number of 32]

-continued $$K_i = \omega_c \cdot R_1 \quad (32)$$

where ωc is the set response frequency of the current controller.

The current control system can be set by Formula (31) and Formula (32) above. In addition, the integral gain can be set without using R1, set by the following formula and can be control.

[Number of 33]

$$K_i = \frac{1}{5}\omega_c^2 \cdot L_\sigma \quad (33)$$

Using Formula (31) and Formula (33), a current control system can be constructed as long as the value of leakage inductance Lσ is set. Therefore, if Lσ is measured at the beginning of the constant estimation, the current can be controlled at a constant level in a series of subsequent constant estimation operations to ensure that the current is controlled at a constant level.

As described above, in this example, the measurement of leakage inductance Lσ is provided at the beginning of the entire process in order to set up the current control system.

Constant estimator 8D shown in FIG. 7, has a harmonic generator 35 for measuring leakage inductance, from which a high-frequency voltage of several hundred [Hz] is generated, which is a different frequency than the sliding frequency given in periods [D] and [E] shown in FIG. 6. The switcher33 selects the voltage so that this harmonic voltage for leakage inductance measurement is output only in the newly established period [A]. Outside of period [A], zero setter34 is selected and the voltage is zero.

Slip frequency switcher 31D and switcher 32D also have five contacts, and both the excitation current command and slip frequency are set to zero during period [A]. Constant arithmetic instruments30D also calculates the leakage inductance Lσ.

FIG. 8 shows the configuration of controller6D. Most of the configuration is the same as in FIG. 1, with the difference that additive and subtract20*e* are added to the output of the d-axis current controller14 to allow addition of the harmonic voltage Vh output from the constant estimator8D. Vh. As a result, harmonic voltages are applied to the d-axis voltage and harmonic currents are generated on the d-axis.

As the frequency of the harmonic voltage increases, the induction machine1 can be regarded as a mere leakage inductance Lσ, so the impedance can be obtained from the harmonic voltage on the d-axis during the period [A] and the current generated by it to obtain the value of Lσ.

FIG. 9 shows the situation. Compared to the waveform of Example 3 (FIG. 6), a period [A] is inserted at the beginning, and harmonic voltage is applied to induction machine 1 in this section, resulting in pulsation due to harmonics in the d-axis current. From this pulsation component and the applied harmonic voltage, the leakage inductance Lσ can be derived. By obtaining the leakage inductance, the gain setting of the current controller can be optimized and the accuracy of the induction machine1 constant estimation can be further improved.

As described above, this example enables more accurate constant setting.

Example 5

Figure 10:
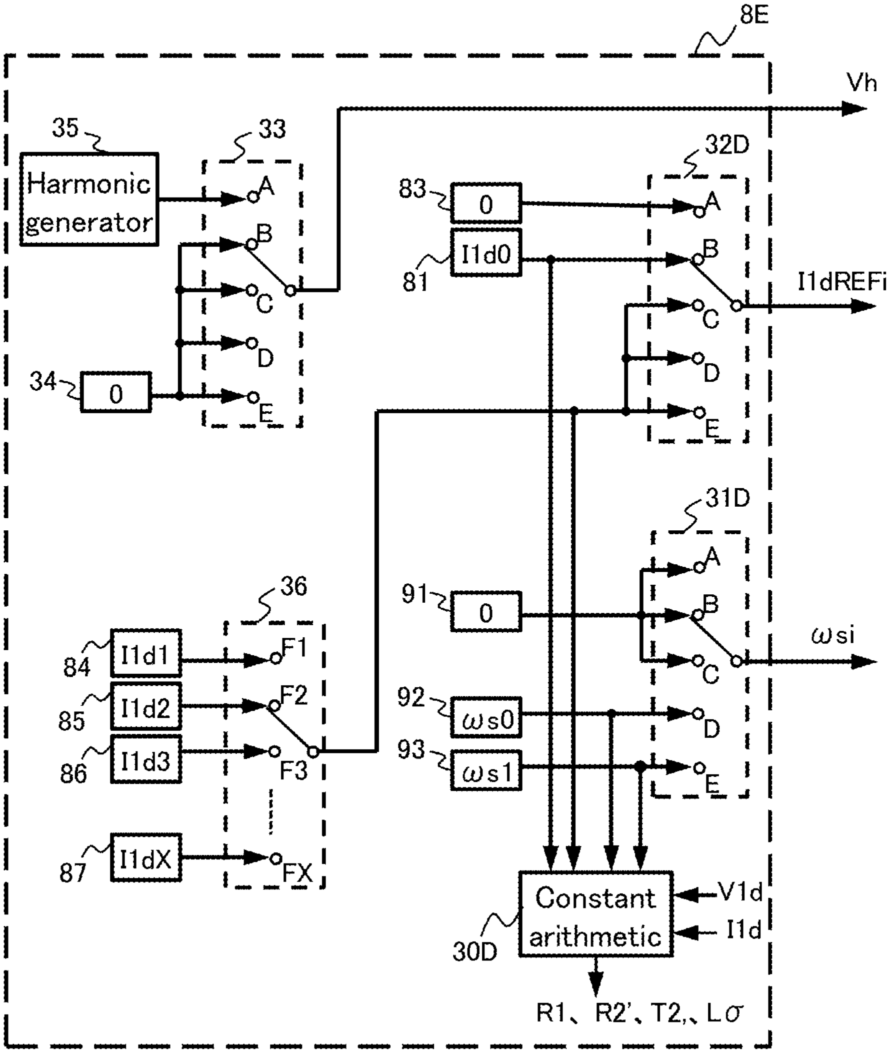
FIG. 10 The figure shows the constant estimator of the drive unit for induction motor in Example 5.
Figure 11:
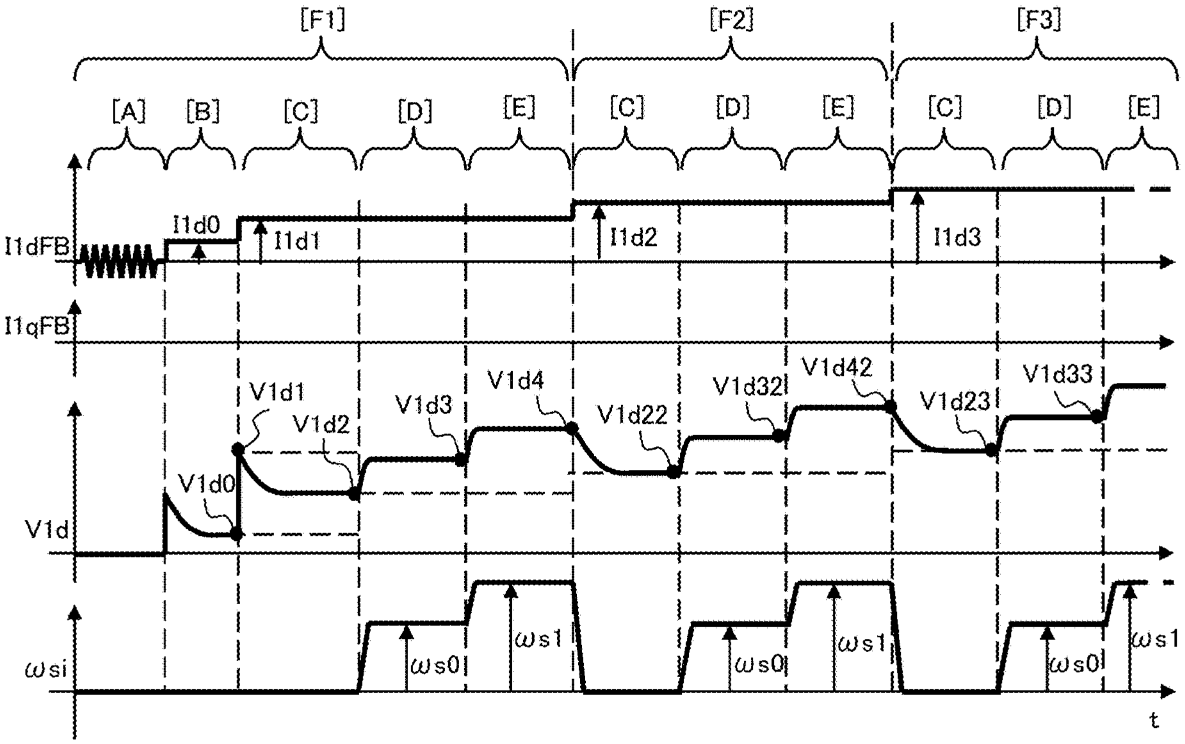
FIG. 11 The figure shows the waveforms of current, voltage, and frequency during constant estimation in Example 5.
Figure 12:
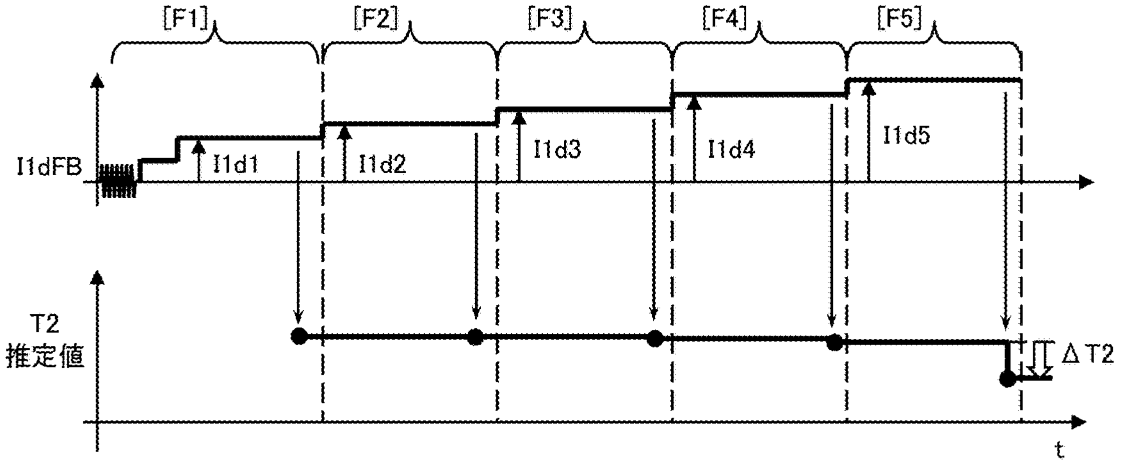
FIG. 12 The figure shows the waveforms of current and secondary time constant estimates during constant estimation in Example 5.

FIG. 10 to FIG. 12 are used to explain the drive unit for induction motor in this example.

FIG. 10 shows the constant estimator 8E in this example, which is an improvement of the constant estimator 8D in Example 4.

The drive unit for induction motor in this example can be realized by replacing the constant estimator 8D in FIG. 7 with the constant estimator 8E shown in FIG. 10.

In Examples 1 through 4, we described how to derive the electrical constants of the induction motor, Lσ, R1, R2', and T2. When driving an induction motor, in addition to these constants, it is necessary to set the value of the excitation current command I1dREF appropriately. In some cases, it is stated on the nameplate of the induction motor, but if it is not stated, it must be set. This example describes the method for estimating the excitation current command.

In the constant estimator8E shown in FIG. 10, a switcher36 is added, and the excitation current commands for constant estimation are switched and given by the switcher36. Also, at the input of the switcher36, the measuring excitation current setting devices 84 to 87, which set the current commands in the measurement mode, are connected so that multiple excitation current commands can be set, such as I1d1, I1d2, I1d3, . . . , I1dX, and so on.

FIG. 11 shows the operation waveforms in this example. Period [F1] shown in FIG. 11 is the same as FIG. 9 in Example 4. After the end of period [F1], the excitation current is switched to I1d2 by switcher 36, and the operations of periods [C], [D], and [E] are performed again as periods [F2] and [F3]. In this way, the measurement of the secondary time constant T2 is carried out repeatedly while changing the excitation current little by little the method of deriving T2 is the same as in the previous examples.

FIG. 12 shows the output of the calculated result of the secondary time constant T2 in this example. As the excitation current command is gradually increased, a phenomenon occurs in which the calculated value of T2 decreases significantly. This is because the excitation current has become larger than the original design value and saturation has occurred in the secondary magnetic flux, resulting in a shortening of the secondary time constant. Therefore, after calculating T2, calculate ΔT2 which is the difference from the previous value, and when the value decreases significantly, it is judged to be "saturated", and the excitation current value before it can be determined that it is the maximum value of the excitation current setting value. In the case of FIG. 12, I1d4 is the maximum value of the appropriate value of the excitation current.

Thus, by using this example, it is possible to set the excitation current only in the stopped state, even for induction motors for which the excitation current setting is unknown.

The above is an example of the implementation of the present invention. Since the present invention estimates constants under the actual operating conditions of the induction motor, it is possible to obtain the necessary constants for control, enabling high starting torque and highly accurate torque control.

The invention also makes it possible to estimate the electrical constants required to control the induction motor with high accuracy in a short time without rotating and driving the induction motor, thus realizing high starting torque and highly accurate torque control. Therefore, carbon emissions can be reduced and global warming can be prevented, contributing to the realization of the SDGs (Sustainable Development Goals), especially item 7, energy.

The invention is not limited to the above examples, but includes various variations. For example, the above examples are described in detail to explain the invention in an easy-to-understand manner, and are not necessarily limited to those having all the described configurations. It is also possible to replace a part of the configuration of one example with that of another example, and it is also possible to add the configuration of another example to that of one example. It is also possible to add, delete, or replace some of the configurations of each example with other configurations.

REFERENCE SIGNS LIST

1: Three-phase induction motor
2: Inverter
3: Mechanical load
4: Brake
5: Current detector
6: Controller
7: speed command generator
8: Constant estimator
9: Im setting device
10: speed controller
11: Zero setter
12: speed estimator
13: slip arithmetic unit
14: d-axis current controller
15: q-axis current controller
16: coordinate axis calculator
17: dq inverse coordinate converter
18: dq coordinate converter
19: pole logarithmic gain
20*a*, 20*b*, 20*c*, 20*d*: additive and subtractive
21A, 21B, 21C, 32B, 32C, 32D, 33, 36: Switchers
22: PWM generator
30: constant arithmetic instruments
31, 31B, 31C, 31D: slip frequency switcher
81 to 87: measuring excitation current setting device
91: Zero setter
92: ωs0 setting instrument

The invention claimed is:

1. A drive unit for induction motor comprising,
a three-phase induction motor;
a fixing mechanism that can fix a rotation shaft of the three-phase induction motor;
an inverter that drives the three-phase induction motor; and
a current detecting means that detects a current of the three-phase induction motor, wherein
the current detected by the current detecting means is obtained and the three-phase induction motor is controlled by the inverter,
with the three-phase induction motor fixed to the rotating shaft by the fixing mechanism, a DC current and a three-phase AC current are energized using the inverter,
the frequency of the three-phase AC current energized by the inverter is a low frequency of 5% or less of the rated drive frequency of the three-phase induction motor,
two different frequencies of alternating current are energized as the three-phase AC current with the energizing of the DC current being performed multiple times with different amplitudes, and
a secondary time constant of the induction motor and a set value of an excitation current are obtained based on voltage values of respective control voltages obtained by energizing the DC current and the three-phase AC current.

2. A drive unit for induction motor according to claim 1, wherein
the control of the currents to be energized is controlled on a coordinate axis according to a current phase output by the inverter, and the voltage values to be acquired to obtain the secondary time constant are values on the coordinate axis.

3. A drive unit for induction motor according to claim 1, wherein
the control of the currents to be energized is controlled on Cartesian coordinate axes according to a current phase output by the inverter,
the control is performed so that the currents become a predetermined current on one axis and zero current on the other axis, and
based on the voltage values obtained on the Cartesian coordinate axes as a result, measuring the secondary time constant.

* * * * *